Patented July 21, 1925.

1,546,499

UNITED STATES PATENT OFFICE.

PIERRE LOUIS GASTON MARCOTTE, OF CHOISY-LE-ROI, FRANCE.

PROCESS FOR THE UTILIZATION OF LUMINESCENT AND CATALYTIC SUBSTANCES.

No Drawing.   Application filed July 31, 1922. Serial No. 578,799.

*To all whom it may concern:*

Be it known that I, PIERRE LOUIS GASTON MARCOTTE, citizen of the French Republic, residing at Choisy-le-Roi, Seine, in the Republic of France, have invented new and useful Improvements in Processes for the Utilization of Luminescent and Catalytic Substances, of which the following is a specification.

This invention has for its object the utilization of luminescent substances, i. e., these substances which under the action of any of the radiations of the visible or invisible spectrum are adapted to emit visible or invisible radiations, essentially characterized in that it consists in a preliminary choice within more or less narrow limits of the crystals composing the said luminescent substance and possessing a visible or invisible fluorescence or phosphoresence, this choice putting in evidence certain properties of the product obtained which are of a particularly interesting nature as concerns numerous applications of the same in radioscopy, radiography and radiotherapy.

It has been recognized in general that for a given substance, aside from the properties due to the method of preparing such substances that certain of their properties depend upon crystallographic conditions and especially upon the dimensions, volume, angles, etc., of the elementary crystals composing the same, and it is thus evident that the elementary constitution of a crystallized substance is not a matter of indifference as regards its various uses. This is found to be particularly true for the crystallized compounds which become fluorescent under the action of the X-rays and may thus be used in radiology. The luminous value of the crystals composing such substances is observed to vary towards the maximum as the crystals become larger or in other cases on the contrary as they become smaller.

For example, in a state of great fineness, certain crystals used in the manufacture of radioscopic screens possess a low degree of fluorescence and a yellow colour which is not favourable to observation of images. When choice is made of crystals of increasing size, the value of the brilliancy due to fluorescence will increase, while the colour changes to yellow-green, green-blue and finally to bluish white, the observation of the images becoming easier by degrees.

But hitherto the products obtained by the known chemical methods have been used as prepared, except for a rough sifting intended simply to remove crystals of an unusal size which would be prejudicial to the proper mounting of the screen and thus the material used will comprise crystals of all sizes; the colours of fluorescence which are characteristic of each type of crystal will thus be combined to produce a resulting colour. In these conditions, the advantage which might be gained by a favourable colour of fluorescence due to one class of crystals is diminished by the presence of smaller crystals.

It is thus observed that it will be advantageous to eliminate from such prducts all the crystals having an unfavourable effect, and it is this which forms the object of the present invention. According to my process, choice is made within very narrow limits of the crystals which exclusively constitute the luminescent substance employed. One makes this selection for instance by a double sifting which serves to limit the maximum and minimum size of the available crystals, and hence the limits of choice can be made as narrow as may be desired.

The said process is particularly used in cases analogous to the one which is to be further mentioned, this being given solely by way of example. But as proved by actual practice, it affords a great progress in the production of screens for radiologic purposes, and radiological examination can now be more readily effected and with improved results, these being especially of a very uniform nature.

For producing radioscopic screens, if substances should be used in the pure and crystallized state and with no selection, such as may be obtained by a preparation according to the well-known methods, i. e., tungstate of zinc, cadmium or magnesium or like fluorescent substance, the screens thus obtained will have but a moderate degree of brilliancy under the action of X-rays, and these are not available as substitutes for the usual platinocyanide of barium screens, such substitutes having however been sought during the past period by reason of the scarcity and increased cost of platinum. On the contrary, if one eliminates on the one hand the small crystals, whose yellowish luminosity is the smallest and the least available for observing radioscopic images, by means of a sieve No. 200, for example and on the other hand the exceptionally large crystals by means of a sieve No. 80, one obtains a material which will afford more brilliant radioscopic screens than with the screen above mentioned. From a practical point of view, such screens will give the same results as the platinocyanide of barium screens. Furthermore, should the raw material be treated so as to select only the crystals corresponding to sieve numbers comprised between 150 and 120, for example, one obtains a material which possesses a remarkable degree of luminosity, and screens thus prepared will afford much better radioscopic examination than with the usual platinocyanide of barium screens which are taken as the standard of comparison.

It is thus observed that by preparing the screens with a material composed of crystals selected within rather narrow limits, such screens are given radiologic and radioscopic properties of a novel character, and this constitutes a considerable progress as well as a great economy, since the component products are much less expensive than the platinocyanide of barium hitherto employed, and at the same time the operator is better protected against the radiations.

Aside from the above-mentioned example, it should be observed that the most varied effects can be obtained in different fields of operation, by employing suitable mixtures of crystals of different classes which are selected according to my said process. Two other applications of the process are set forth as follows:

In radiotherapy, use has been made during the past period of small surfaces or discs covered with platinocyanide of barium for dosing the X-rays. The green colour of the platinocyanide of barium is found to change as the action of the rays continues, and this action is stopped when the disc has attained a yellowish brown shade which serves as a standard colour. Although this method is much in use, it gives but very uncertain results, and one cause of this lack of precision is due to the fact that the crystals of platinocyanide of barium have different sizes and hence do not change colour at a uniform rate under the action of the X-rays. But the proportion of crystal of different sizes will vary according to each preparation, so that such discs cannot afford precise results. It is obvious that a great improvement will be obtained in this field by selecting the crystals according to my said process, so, as to obtain a regular rate of the change of colour for all the discs of a given series.

On the other hand, the oxides or crystallized substances, either luminescent or not, which are used directly in the form in which they are obtained in certain processes, are found to produce rather irregular results, and they also give rise to accessory derivatives whose formation should however be limited. On the contrary, these same substances when employed after making the selection by sorting according to my invention will possess much better defined properties and will therefore have a much more regular catalytic action, and they also obviate to an appreciable degree the formation of secondary compounds.

From the indications above set forth, it is evident that the method of selection which forms the object of this invention will admit of obtaining crystalline substances which act by luminescence, catalysis, etc., in conditions which are much more regular, advantageous and economical than with the untreated crystals employed according to the known methods.

Having now described my invention, what I claim as new and desire to secure by Letters Patent is:

A method for the manufacture of apparatus adapted for the emission of rays under the action of a determined radiation by the use of crystallized substances, characterized in that the crystals having the same crystallographic characteristics are classified by any suitable means in various groups according to their size, whereby one or several groups employed in well determined proportions will give the maximum output in the particular desired use, the other groups being neglected owing to their improper properties prejudicial to the best desired output.

In testimony whereof I have signed my name to this specification.

PIERRE LOUIS GASTON MARCOTTE.